United States Patent
Yoon

(10) Patent No.: US 9,863,511 B2
(45) Date of Patent: Jan. 9, 2018

(54) BELT AUTO-TENSIONER

(71) Applicant: Hyundai Motor Company, Seoul (KR)

(72) Inventor: Je Yong Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 14/959,650

(22) Filed: Dec. 4, 2015

(65) Prior Publication Data

US 2016/0363196 A1    Dec. 15, 2016

(30) Foreign Application Priority Data

Jun. 15, 2015   (KR) .................. 10-2015-0083957

(51) Int. Cl.
*F16H 7/12*    (2006.01)
*B60K 25/02*   (2006.01)
*F16H 7/08*    (2006.01)

(52) U.S. Cl.
CPC ........... *F16H 7/1218* (2013.01); *B60K 25/02* (2013.01); *F16H 7/0831* (2013.01); *F16H 2007/081* (2013.01); *F16H 2007/0893* (2013.01)

(58) Field of Classification Search
CPC ............... F16H 7/1218; F16H 7/0831; F16H 2007/081; F16H 2007/0893; B60K 25/02
See application file for complete search history.

(56) References Cited

U.S. PATENT DOCUMENTS

| | | | | |
|---|---|---|---|---|
| 2011/0015016 A1* | 1/2011 | Serkh | ................... | F16H 7/1218 474/135 |
| 2012/0058847 A1* | 3/2012 | Ferguson | .............. | F16H 7/1218 474/135 |
| 2013/0217526 A1* | 8/2013 | Fittro | ................... | F16H 7/1281 474/135 |
| 2015/0247558 A1* | 9/2015 | Hamers | ................. | F16H 7/1218 474/117 |
| 2015/0276024 A1* | 10/2015 | Jiang | .................... | F16H 7/1218 474/135 |
| 2016/0146313 A1* | 5/2016 | Ma | ........................ | F16H 7/1218 474/135 |

(Continued)

FOREIGN PATENT DOCUMENTS

| | | |
|---|---|---|
| JP | 05-30595 | 4/1993 |
| JP | 06-37630 | 5/1994 |
| JP | 2002-005253 | 1/2002 |

(Continued)

*Primary Examiner* — Michael Mansen
*Assistant Examiner* — Robert T Reese
(74) *Attorney, Agent, or Firm* — Brinks Gilson & Lione

(57) ABSTRACT

The present disclosure provides a belt auto-tensioner that automatically adjusts tension of a belt for rotational force transmission between an engine and auxiliary machinery components, the belt auto-tensioner comprising: an upper cover that is provided with a pulley being in contact with the belt and has a receiving space provided so as to be spaced apart from the pulley; a tensioner body that is inserted into the receiving space, and provides friction attenuation to the upper cover when the upper cover rotates in a direction opposite to a direction of tension applying engagement by the tension of the belt; and a friction unit that is installed on an inner surface of the receiving space, and is formed so as to rub against an outer surface of the tensioner body when the upper cover rotates.

5 Claims, 3 Drawing Sheets

(56) References Cited

U.S. PATENT DOCUMENTS

2017/0023108 A1* 1/2017 Bauerdick ............. F16H 7/0831

FOREIGN PATENT DOCUMENTS

| JP | 2003-207000 | 7/2003 |
| JP | 2003-287095 | 10/2003 |
| JP | 2013-124747 A | 6/2013 |
| JP | 2014-005870 | 1/2014 |
| JP | 2014-169731 A | 9/2014 |
| KR | 10-2010-0016085 A | 2/2010 |

* cited by examiner

PRIOR ART

BELT AUTO-TENSIONER

CROSS-REFERENCE TO RELATED APPLICATION

This application claims the benefit of Korean Patent Application No. 10-2015-0083957 filed on Jun. 15, 2015, the entirety of which is hereby incorporated by reference.

FIELD

The present disclosure relates to a belt auto-tensioner.

BACKGROUND

The statements in this section merely provide background information related to the present disclosure and may not constitute prior art.

Generally, when an auxiliary machinery component connected to an engine through a belt in a power transmittable manner is applied to an engine, an auto-tensioner is mounted which automatically adjusts and maintains the tension of the belt, that is, the auxiliary machinery belt.

In particular, in a diesel engine of a passenger vehicle, since a starter generator receives the provision of the power from the engine through the belt or transmits the power to the engine, a tension state and a relaxed state of the auxiliary machinery belt continuously varies depending on the operating condition and the starter generator of the engine.

SUMMARY

The present disclosure provides a belt auto-tensioner that can maintain the constant damping, regardless of the change in the load applied to the torsion spring, by disposing the friction member installed in the auto-tensioner independently of the torsion spring.

In one aspect, the present disclosure provides a belt auto-tensioner that automatically adjusts the tension of the belt for rotational force transmission between an engine and auxiliary machinery components, the belt auto-tensioner comprising: an upper cover that is provided with a pulley being in contact with the belt and has a receiving space provided so as to be spaced apart from the pulley; a tensioner body that is inserted into the receiving space, and provides friction attenuation to the upper cover when the upper cover rotates in a direction opposite to a direction of tension applying engagement by tension of the belt; and a friction unit that is installed on an inner surface of the receiving space independently of the tensioner body, and that is formed so as to rub against the outer surface of the tensioner body when the upper cover rotates.

In one form, the friction unit has a groove that is provided with a plurality of bent regions, and is installed so that both ends are inserted into a pair of first engagement grooves provided on the inner surface of the receiving space, and a friction member that is installed so that both ends are inserted into a pair of second engagement grooves provided so as to be spaced apart from the first engagement groove, and is formed so as to have a curvature corresponding to an outer diameter of the tensioner body.

In another form, the friction unit further includes an elastic member that is installed on the inner surface of the receiving space and provides elastic force to the groove.

In still another form, the groove receives transmission of the elastic force from the elastic member and presses the friction member to maintain a state in which the friction member rubs against the tensioner body.

In yet another form, the tensioner body includes a torsion spring that is formed so as to wrap a rotary shaft, is compressed in a load acting direction when the load is transmitted according to the rotation of the upper cover, and offsets the transmitted load by the elastic force.

The present disclosure has an effect of maintaining the constant damping force regardless of changes in the outer diameter of the torsion spring according to the load application, by disposing the friction member installed in the auto-tensioner independently of the torsion spring.

Accordingly, the present disclosure has an effect of allowing the damping friction force to be set to as much as damping torque is required for the auto-tensioner.

Further, the present disclosure has an effect of maintaining a constant correlation between the damping friction force and the real mold conditions according to the production specifications, by allowing the damping friction force measured in the production (mass production) line to be exhibited even during operation of the auto-tensioner.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g. fuels derived from resources other than petroleum. As referred to herein, a hybrid vehicle is a vehicle that has two or more sources of power, for example both gasoline-powered and electric-powered vehicles.

Further areas of applicability will become apparent from the description provided herein. It should be understood that the description and specific example are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
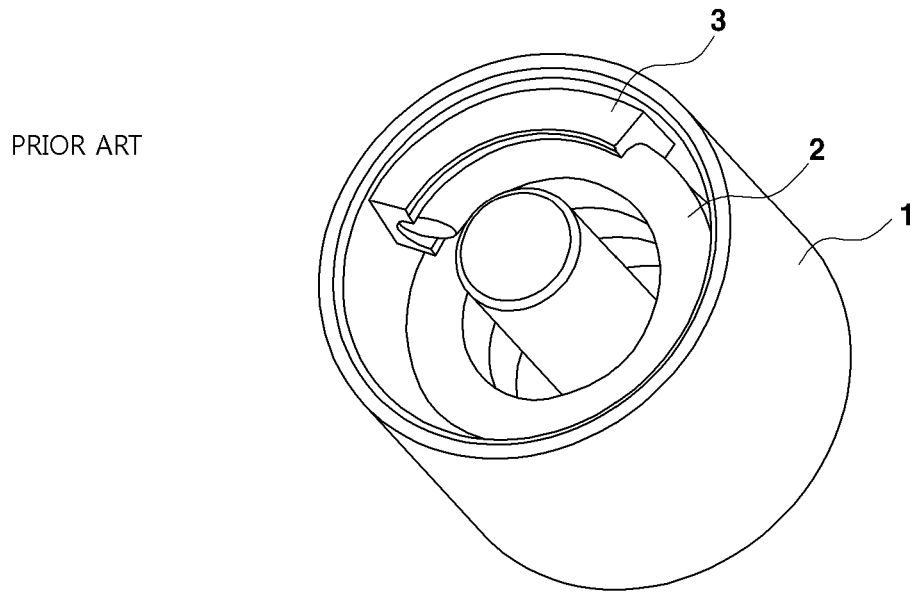
FIG. 1 is a diagram schematically illustrating an existing tensioner body.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Advantages and features of the present disclosure, and a method of achieving the same will become clear when referring to the various forms described below in more detail in conjunction with the accompanying drawings.

Figure 2:
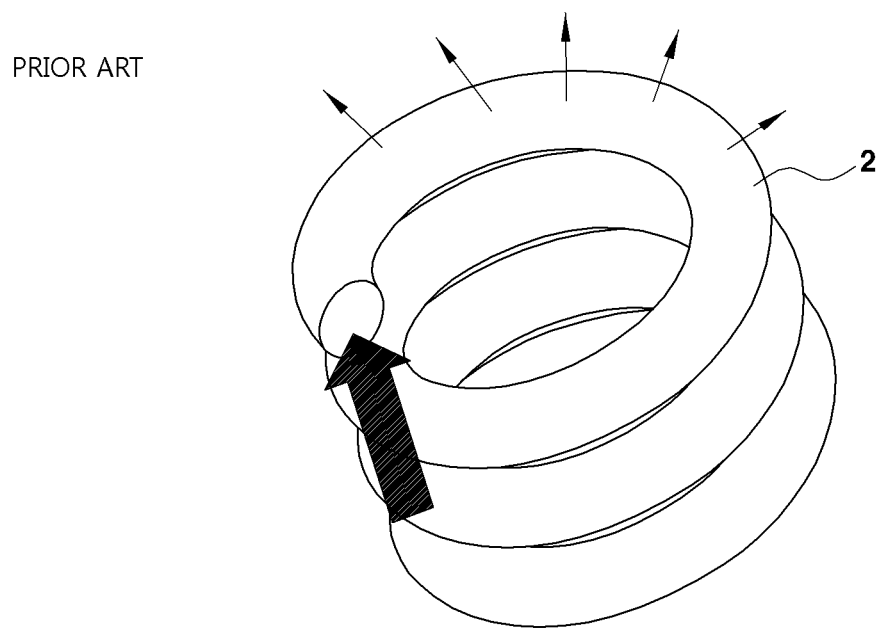
FIG. 2 is a diagram illustrating a torsion spring installed in the interior of the existing tensioner main body.

Hereinafter, FIG. 1 is a diagram schematically illustrating an existing tensioner body. FIG. 2 is a diagram illustrating an existing torsion spring which may be installed in the interior of the existing tensioner main body.

Such an auto-tensioner has a structure in which a friction member 3 is disposed on a spring 2 provided in a tensioner body 1, as shown in FIG. 1. When a load is transmitted, an upper cover rotates, and when the load is applied to the end of the spring 2 in a load acting direction, the auto-tensioner acts so as to offset the load transmitted by force generated while the spring 2 is compressed.

Here, in the case of the spring 2 applied to the auto-tensioner, a torsion spring having a rounded form as shown in FIG. 2 is provided, and due to such characteristics, when the load is applied, the size in the outer diameter direction changes.

That is, in a case of an auto-tensioner in which the friction member 3 is connected to the spring 2, an amount of variation of the outer diameter of the spring 2 varies depending on the magnitude of the load exerted on the spring 2, resulting in a change in the damping friction force of the friction member 3.

For example, when the load exerted on the spring 2 is large, the outer diameter of the spring 2 increases, and since the increased force of the spring 2 is in a direction of pushing toward the tensioner body 1, additional force acts on the friction member 3 that induces a greater friction force.

Accordingly, the damping force of the friction member 3 caused by friction has a non-constant value depending on the acting load. We have discovered that such a non-constant friction may be problematic in that it is a variable that is not easily managed for manufacturing, auto-tensioner development, or production (mass production).

Figure 3:
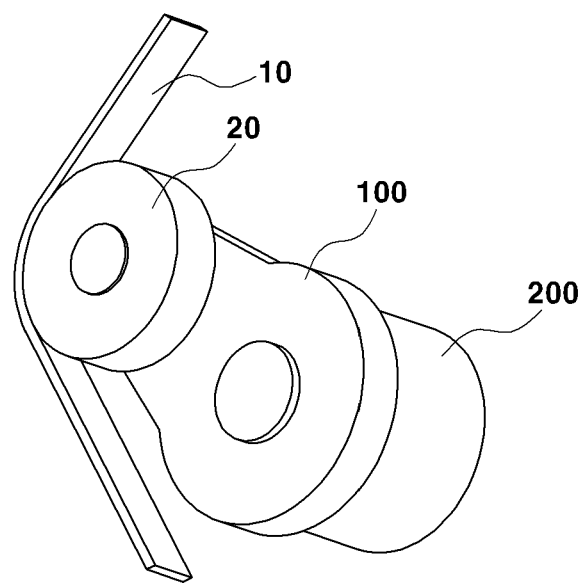
FIG. 3 is a diagram schematically illustrating a belt auto-tensioner according to a form of the present disclosure.
Figure 4:
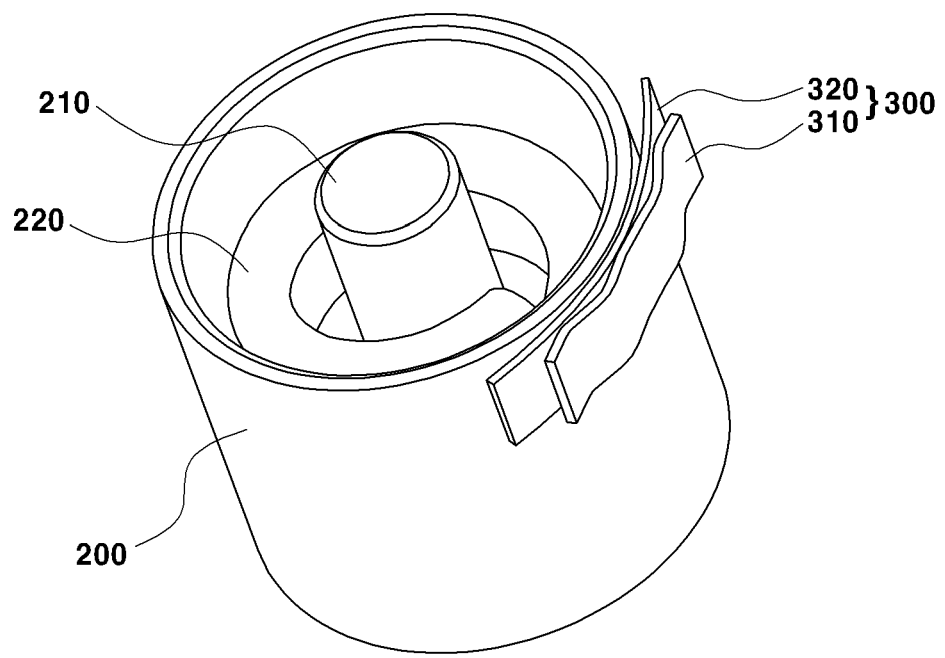
FIG. 4 is a diagram illustrating a tensioner body of the belt auto-tensioner according to a form of the present disclosure.

Hereinafter, FIG. 3 is a diagram schematically illustrating a belt auto-tensioner according to form of the present disclosure. FIG. 4 is a diagram illustrating the tensioner body of the belt auto-tensioner according to form of the present disclosure.

As shown in FIG. 3, the belt auto-tensioner includes an upper cover 100, a tensioner body 200, and a friction unit 300.

First, in the belt auto-tensioner that automatically adjusts the tension of the belt 10 for the rotational force transmission between the engine and the auxiliary machinery components, the upper cover 100 is provided with a pulley 20 in contact with the belt, and has a receiving space A provided so as to be spaced apart from the pulley 20.

The upper cover 100 is formed so as to rotate about a rotary shaft 210, as the pulley 20 moves when the tension of the belt 10 varies.

That is, when the pulley 20 is pushed according to the tension variation of the belt 10, the upper cover 100 rotates along the rotary shaft 210 in a clockwise direction, and the load is transmitted to an end portion of a torsion spring 220 installed inside the tensioner body 200 by the rotational force of the upper cover 100.

Next, the torsion spring 220 acts so that the tension of the belt 10 can be maintained by attenuating the load transmitted by the elastic restoring force. As described above with reference to FIG. 2, the outer diameter of the torsion spring 220 radially increases depending on the magnitude of the load transmitted by the rotation of the upper cover 100.

For example, when the load applied to the torsion spring 220 is large, the outer diameter of the torsion spring 220 increases. In this case, force generated as the outer diameter of the torsion spring 200 increases is in a direction that pushes upon the inner surface of the tensioner body 200. If the friction member 320 is a structure assembled to the torsion spring 200, this additional force acts on the friction member 320.

Thus, when the friction member 320 is assembled and directly connected to the torsion spring 220 within the tensioner body 200, the damping force measured in the friction member 320 may not be constant as a result of the additional force described above.

Therefore, in one form of the present disclosure, the friction unit 300 is installed independently of the torsion springs 220 as shown in FIG. 4, rather than being connected to the torsion spring 220 within the tensioner body 200. Thus, it is possible to maintain the constant damping, regardless of the amount of variation of the outer diameter of the torsion spring 220 due to the load transmission.

The friction unit 300 is installed on the inner surface of the receiving space A, and is formed so as to be in contact with the outer surface of the tensioner body 200 during rotation of the upper cover 200.

The frictional unit 300 includes a groove 310 and a friction member 320.

The groove 310 is formed with a plurality of bent regions, and is formed such that the friction member 320 is pressed on the inner surface of the receiving space A.

The friction member 320 is installed in front of the groove 310 on the inner surface of the receiving space A, is formed to have a curvature corresponding to the outer diameter of the tensioner body 200, and is provided so as to be in contact with the tensioner body 200.

Further, since the friction member 320 is installed independently of the torsion spring 220 provided inside the tensioner body 200 and measures the damping friction force caused by the rotation of the tensioner body 200 when in contact with the outer peripheral surface of the tensioner body 200, a constant damping force may be measured even as the outer diameter of the torsion spring 220 varies.

Thus, a belt auto-tensioner according to one form of the present disclosure may set the damping friction force to be as much as the damping torque that is independently required for the auto-tensioner.

Since the belt auto-tensioner may measure a constant damping force regardless of changes in the outer diameter of the torsion spring 220 by installing the friction member 320 independently of the torsion spring 220, the damping friction force measured during production (mass production) can be exhibited even during driving of the auto-tensioner.

Accordingly, in this form, since it is possible to measure the same damping frictional force in the friction member 320 as in production (mass production), correlation with the real metal mold conditions according to the production (mass production) may be maintained.

Figure 5:
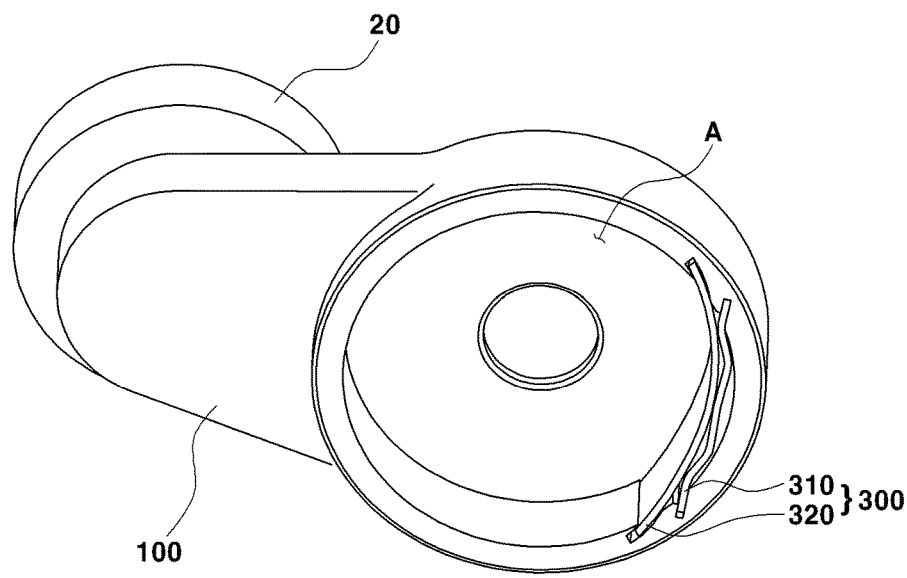
FIG. 5 is a diagram illustrating an upper cover of the belt auto-tensioner according to a form of the present disclosure.
Figure 6:
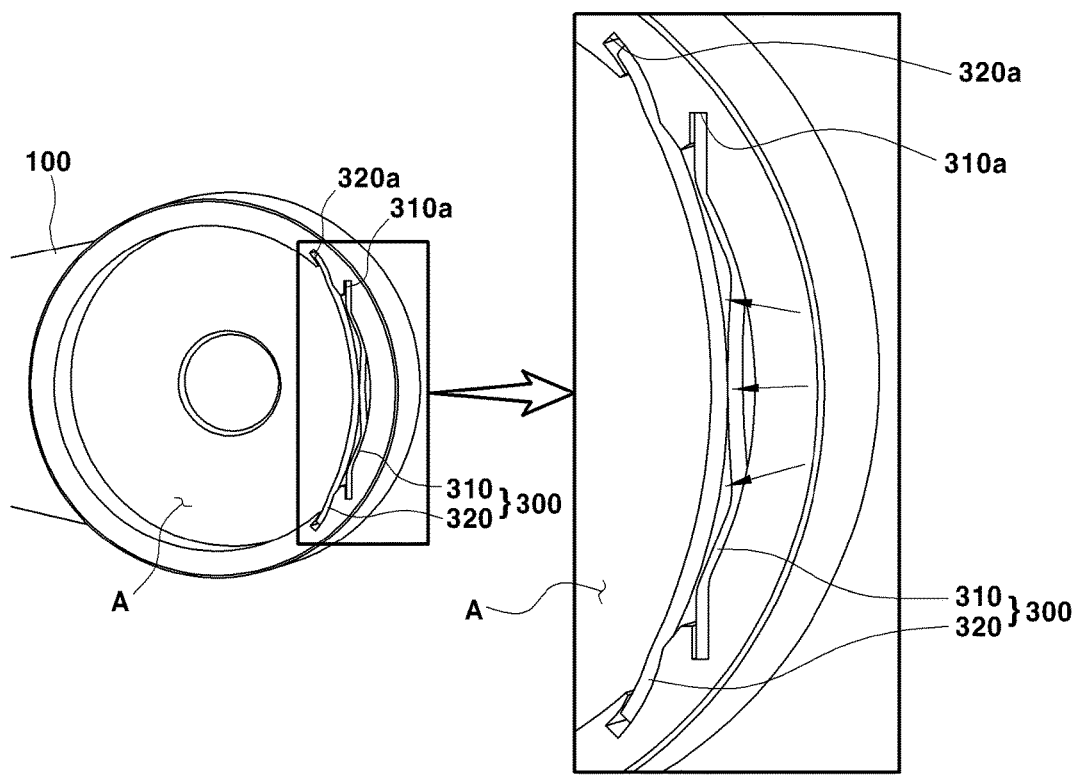
FIG. 6 is an enlarged view illustrating a receiving space of the belt auto-tensioner according to a form of the present disclosure.

Hereinafter, FIG. 5 is a diagram illustrating the upper cover of the belt auto-tensioner according to one form of the present disclosure, and FIG. 6 is an enlarged view illustrating a receiving space of the belt auto-tensioner according to one form of the present disclosure.

As shown in FIGS. 5 and 6, a friction unit 300 according to the present disclosure includes a groove 310 and a friction member 320.

The groove 310 is installed so that both ends are inserted into a pair of first engagement grooves 310a provided on the inner surface of the receiving space A.

The first engagement grooves 310a are formed so as to correspond to the shapes of both ends of the groove 310 formed with a bent region. The first engagement grooves 310a have a predetermined width so that fixing can be performed in a state in which both ends of the groove 310 are inserted therein.

The friction member 320 is formed of a plastic material, and is installed so that both ends are inserted into second engagement grooves 320a spaced apart from the first engagement groove 310a in the receiving space A.

The second engagement grooves 320a have a predetermined curvature so as to correspond to the curvature of the friction member 320. The second engagement grooves 320a are formed in the receiving space A and guide the installation position of the friction member 320 so that the friction member 320 is placed in front of the groove 310.

Meanwhile, the friction unit 300 may further include an elastic member (not shown).

The elastic member (not shown) is provided between one side of the groove 310 formed with the bent region and the inner surface of the receiving space A, and is preferably formed of a spring product so as to be able to press one side of the groove 310. However, it is also possible to install other members having the same purpose and having elasticity.

As a result, the elastic member (not shown) provides the elastic force toward one side of the groove 310 so that the other side of the groove 310 presses the friction member 320, thereby being able to effectively maintain a state in which the friction member 320 rubs against the outer circumferential surface of the tensioner body 200.

According to the present disclosure, since the friction member installed in the auto-tensioner is disposed independently of the torsion spring, there is an effect of maintaining the constant damping force independent of changes in the outer diameter of the torsion spring caused by the load application.

Accordingly, the present disclosure has an effect of allowing the damping friction force to be set to as much as the damping torque is required for the auto-tensioner.

Further, according to the present disclosure, since the damping friction force measured in the production (mass production) line may be exhibited during driving of the auto-tensioner, there is an effect of allowing the correlation with the real mold conditions according to the production specifications to be maintained at a constant level.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A belt auto-tensioner that automatically adjusts tension of a belt for rotational force transmission between an engine and auxiliary machinery components, the belt auto-tensioner comprising:
    an upper cover that is provided with a pulley configured to make contact with the belt and having a receiving space spaced apart from the pulley;
    a tensioner body that is inserted into the receiving space, and provides friction attenuation to the upper cover when the upper cover rotates in a direction opposite to a direction of tension applied by the belt; and
    a friction unit that is installed on an inner surface of the receiving space independently of the tensioner body, and is formed so as to rub against an outer surface of the tensioner body when the upper cover rotates; wherein the friction unit comprises:
        a groove that is provided with a plurality of bent regions and is installed so that both ends may be inserted into a pair of first engagement grooves provided on the inner surface of the receiving space; and
        the friction member is installed so that both ends are inserted into a pair of second engagement grooves spaced apart from the first engagement grooves, and is formed having a curvature corresponding to an outer diameter of the tensioner body.

2. The belt auto-tensioner of claim 1, wherein the friction unit further includes an elastic member that is installed on the inner surface of the receiving space and provides an elastic force to the groove.

3. The belt auto-tensioner of claim 2, wherein the groove receives transmission of the elastic force from the elastic member and presses the friction member to maintain a state in which the friction member rubs against the tensioner body.

4. The belt auto-tensioner of claim 1, wherein the tensioner body comprises:
    a rotary shaft formed in an inner center of the tensioner body so that the upper cover may pivot; and
    a torsion spring that is formed so as to wrap the rotary shaft, is compressed in a load acting direction when a load is transmitted according to the rotation of the upper cover, and offsets the transmitted load by the elastic force.

5. A belt auto-tensioner that automatically adjusts tension of a belt for rotational force transmission between an engine and auxiliary machinery components, the belt auto-tensioner comprising:
    an upper cover having a receiving space defining an inner surface;
    a pulley engaged with the upper cover at a location spaced away from the receiving space, the pulley receiving tension from the belt in a first direction;
    a tensioner body having an outer surface and positioned within the receiving space, the tensioner body structured to provide friction attenuation to the upper cover when the upper cover rotates in a second direction away from the first direction; and
    a friction unit positioned on the inner surface of the receiving space, the friction unit sized and structured to frictionally engage the outer surface of the tensioner body when the upper cover rotates; wherein the friction unit comprises:
        a groove that is provided with a plurality of bent regions and is installed so that both ends may be inserted into a pair of first engagement grooves provided on the inner surface of the receiving space; and the friction member is installed so that both ends are inserted into a pair of second engagement grooves spaced apart from the first engagement grooves, and is formed having a curvature corresponding to an outer diameter of the tensioner body.

* * * * *